United States Patent [19]
Johnson

[11] Patent Number: 5,524,184
[45] Date of Patent: Jun. 4, 1996

[54] ON-LINE BARCODE PRINTER WITH AUTOMATIC COMMUNICATION PARAMETER DETERMINING SYSTEM

[75] Inventor: Kelly Johnson, Centerville, Ohio

[73] Assignee: Monarch Marking Systems, Inc., Dayton, Ohio

[21] Appl. No.: 100,984

[22] Filed: Aug. 4, 1993

[51] Int. Cl.$^6$ .................................................. G06F 15/00
[52] U.S. Cl. ........................................ 395/114; 395/115
[58] Field of Search ................................ 395/117, 114, 395/101, 115, 110, 116, 111, 112; 364/405

[56] References Cited

U.S. PATENT DOCUMENTS 4,835,713  5/1989  Pastor ................................. 395/101
5,081,579  1/1992  Komai et al. ...................... 395/117
5,239,622  8/1993  Best et al. ........................ 395/117
5,287,434  2/1994  Bain et al. ........................ 395/114
5,293,466  3/1994  Bringmann ....................... 395/114

*Primary Examiner*—Raymond J. Bayerl
*Assistant Examiner*—Steven P. Sax
*Attorney, Agent, or Firm*—McAndrews, Held & Malloy, Ltd.

[57] ABSTRACT

An on-line barcode printer is shown for communicating with one of a number of host computers having various communication parameters. The barcode printer automatically determines the communication parameters of the host computer coupled thereto in order to initialize an UART of the printer so as to eliminate the need for manual initialization thereof. The communication parameters automatically determined include baud rate, parity, the number of data bits and the number of stop bits.

20 Claims, 3 Drawing Sheets

ON-LINE BARCODE PRINTER WITH AUTOMATIC COMMUNICATION PARAMETER DETERMINING SYSTEM

TECHNICAL FIELD

The present invention is directed to an on-line barcode printer in communication with a host computer, and more particularly to such a barcode printer and method of operating the printer to automatically determine the communication parameters of the host computer.

BACKGROUND OF THE INVENTION

On-line barcode printers that communicate with a host computer for receiving printing data, format information, etc. therefrom are known to include a UART or DUART (Dual Universal Asynchronous Transmitter-Receiver). In order to operate such a printer with various host computers, the UART must be initialized with information relating to the host computer's communication parameters to allow a serial bit stream received from the host computer to be converted to a parallel data output coupled to the barcode printer's processor, or visa versa. The initialization of the UART is typically accomplished manually by setting dip switches or by entering initialization information to the printer via a keyboard. This manual initialization of the UART is cumbersome and can be time-consuming.

SUMMARY OF THE INVENTION

In accordance with the present invention, the disadvantages of prior on-line barcode printers have been overcome. The on-line barcode printer of the present invention automatically determines communication parameters of a host processing system that is transmitting data to the printer so as to allow the printer to be automatically initialized for communications with that host processing system.

More particularly, at the start of communications with a host computer, the barcode printer of the present invention receives therefrom a data stream having a plurality of high-to-low and low-to-high transitions wherein the time between at least two successive transitions of the data stream represents a single bit sample time. In response to receipt of this data stream, the barcode printer measures the time between successive transitions in the data stream to provide a predetermined number of timer values. The timer values are stored in an array in a memory of the barcode printer. The barcode printer then determines the lowest stored timer value and correlates the lowest stored timer value with a baud rate value that represents the baud rate of communications from the host computer.

In addition to determining the baud rate of communications received from the host processing system, the barcode printer of the present invention determines one or more additional communication parameters of the host computer by converting each of the stored timer values into a binary value based upon the lowest stored timer value. Such additional parameters may represent parity, number of data bits, and number of stop bits associated with communications received from the host computer.

The present invention allows the barcode printer to communicate with any of a number of different host computers each having different communication parameters without requiring the user to manually initialize the printer for such communications. Thus the on-line barcode printer of the present invention is very user friendly. These and other objects, advantages, and novel features of the present invention, as well as details of an illustrated embodiment thereof, will be more fully understood from the following description and from the drawing.

DESCRIPTION OF THE PREFERRED EMBODIMENT

Figure 1:
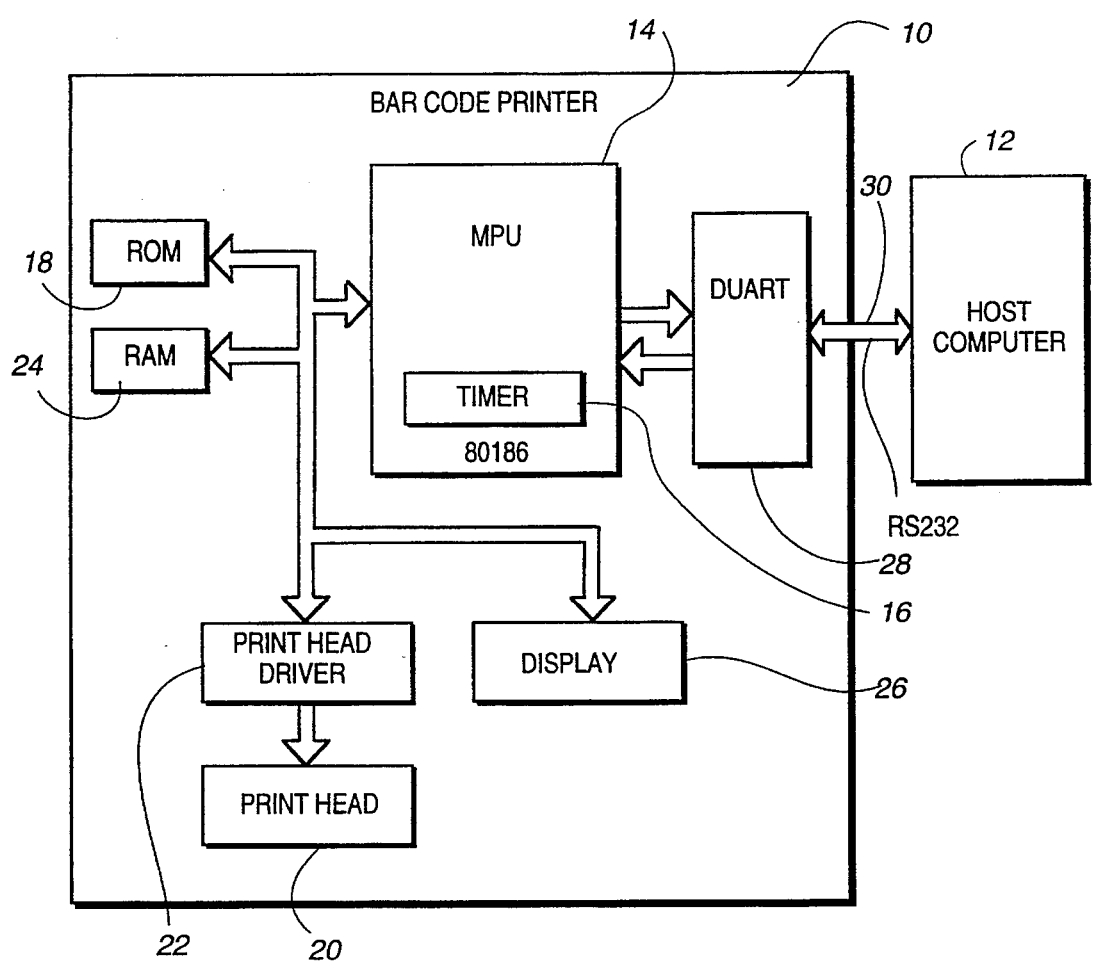
FIG. 1 is a block diagram of an on-line barcode printer in communication with a host computer in accordance with the present invention.

The on-line barcode printer 10, as shown in FIG. 1, is in communication with a host computer 12 via a RS232 communication interface or the like. The barcode printer 10 includes a microprocessor controller 14 having a timer 16 to control various operations of the microprocessor 14. The microprocessor 14 operates in accordance with software stored in a ROM 18 to control a printhead 20 via a driver 22 to print information including barcodes on a web of record members, such as tags, labels, and the like. The barcode printer 10 utilizes a RAM as a scratch pad memory during the operation of the printer. The barcode printer 10 may be a completely on-line printer such that it receives all of its input, such as printing data, format information, font information, etc., from the host computer 12. Alternatively, the barcode printer 10 may include a keyboard coupled to the microprocessor 14, if desired. A display 26, which may be formed of a number of LED's or a liquid crystal display, is coupled to the microprocessor 14 to provide information regarding the operation of the printer 10 to a user.

The barcode printer 10 includes a UART, such as the DUART 28 shown in FIG. 1, to convert parallel data input thereto into a serial data stream and to convert a serial data stream into parallel data so as to interface between the communications network 30 coupled to the host computer 12 and the parallel data input of the controller 14.

In order to simplify the operation of the barcode printer 10 for the user thereof, the microprocessor controller 14 automatically determines communication parameters of the host computer 12 in order to initialize the DUART 28 to these parameters without requiring an input from the user. This feature allows the barcode printer 10 to be completely on-line if desired so that the printer need not have a keyboard or other input for manually initializing the DUART 28. In order to automatically determine the communications parameters of the host computer 12, at the start of communications, the printer 10 receives from the host computer 12 a data stream representing a predetermined number of characters wherein the data stream has a number of high-to-low and low-to-high transitions and is such that the time between at least two successive transitions of the data stream represents a one bit sample time. For example, at the start of communications, the barcode printer 10 receives from the host computer 12 a 22 character ASCII string containing the series "@A@A . . . ". This character string is such that there is at least a single bit data sample time during a twenty sample period.

In order to determine the baud rate of the host computer 12 in communication with the barcode printer 10, the microprocessor 14 measures the time between successive transitions in the initial data stream received from the host computer 12 to provide twenty timer values that are stored in an array in the RAM 24 of the printer 10. The microprocessor 14 determines the lowest stored timer value and correlates the lowest stored timer value with a baud rate value that represents the baud rate of communications from the host computer 12. This correlation is accomplished utilizing a look-up table that stores a number of possible baud rate values, each baud rate value being stored in association with a nominal timer value for a single bit time. The look-up table may be as follows:

| BAUD RATE | SINGLE BIT TIMER VALUE |
| --- | --- |
| 1200 baud | 832 microseconds |
| 2400 baud | 416 microseconds |
| 4800 baud | 208 microseconds |
| 9600 baud | 104 microseconds |
| 19200 baud | 52 microseconds |

The microprocessor 14 determines additional communication parameters of the host computer 12 by converting each of the timer values stored in the timer value array into binary values based upon the lowest stored timer value. For example, if the sample time was 520 microseconds and the baud rate was determined to be 9600 for the lowest timer value of 104 microseconds, the sample time of 520 microseconds represents 520 divided by 104 or 5 bits of data. During the conversion of the timer values into actual binary values, rounding as opposed to truncation is used for fractional results. Each bit of binary data decoded is stored as one entry in a binary value array. For example, the 5 bits of data decoded, as discussed above, represents either 5 zero bits or 5 one bits, depending on the level of the serial data line input to the microprocessor 14.

After each of the timer values has been decoded into binary, the binary array is searched for seven consecutive bits of data. These seven zero bits identify the "A" character in the binary data regardless of the communication parameters used by the host computer 12. The next 16 bits following the zero bits representing the "A" character form a coded word that is used to identify the parity, number of stop bits, and number of data bits sent by the host computer 12. An example of the look-up table that correlates the coded word with parity, number of data bits, and number of stop bits is as follows:

TABLE A

| Parity | # of Data Bits | # of Stop Bits | Coded Word |
| --- | --- | --- | --- |
| none | 7 | 1 | D060 (hex) |
| none | 7 | 2 | E838 |
| none | 8 | 1 | A828 |
| none | 8 | 2 | B416 |
| even | 7 | 1 | E828 |
| even | 7 | 2 | F416 |
| even | 8 | 1 | B412 |
| even | 8 | 2 | BA09 |
| odd | 7 | 1 | A838 |
| odd | 7 | 2 | B41E |
| odd | 8 | 1 | 9416 |
| odd | 8 | 2 | 9A0B |

Figure 2A:
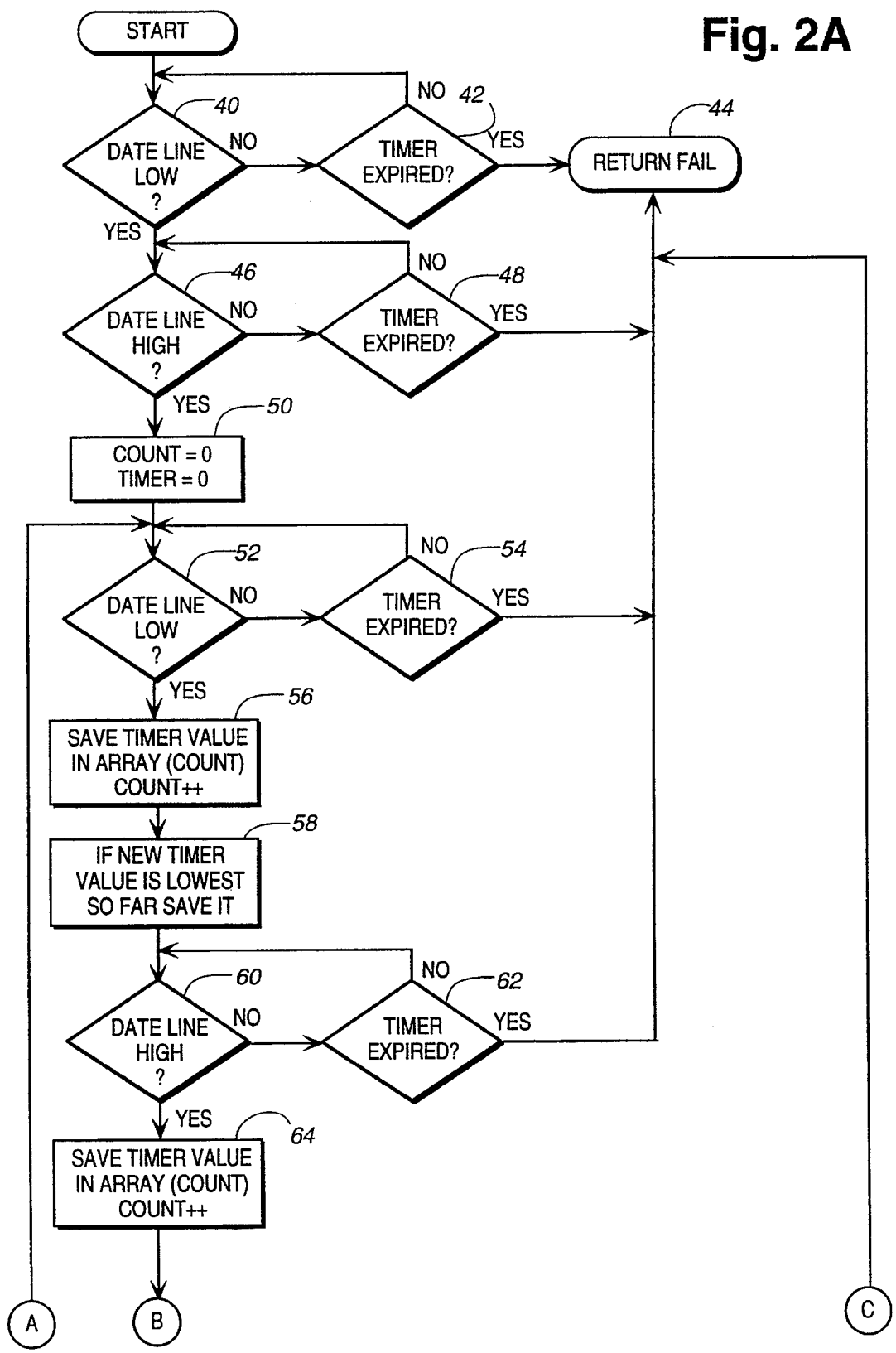
FIGS. 2A and 2B form a flow chart illustrating the barcode printer software for automatically determining communication parameters of a host computer in accordance with the present invention.
Figure 2B:
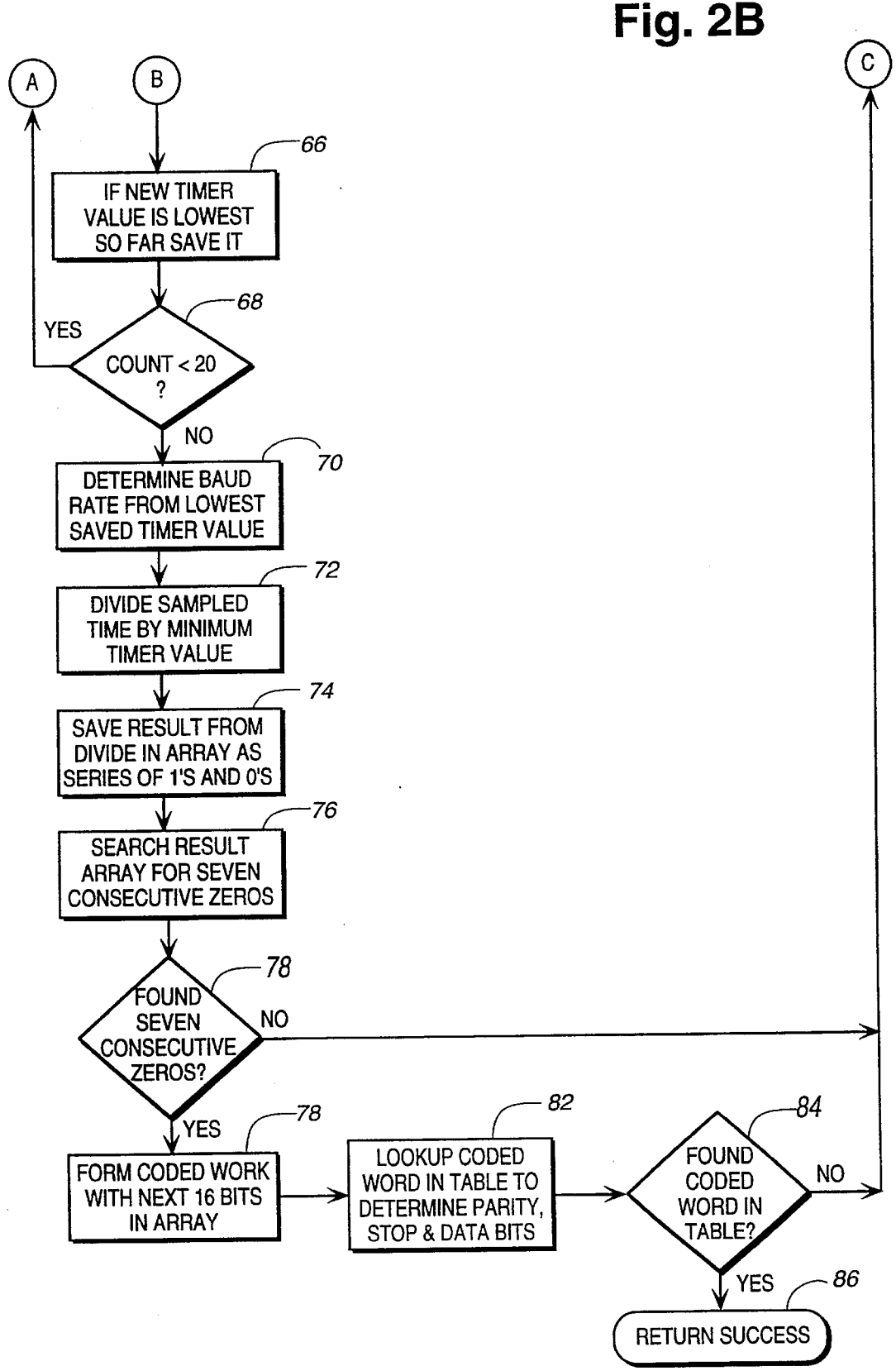

More particularly, the barcode printer 10 operates in accordance with the flow chart depicted in FIGS. 2A–B in order to automatically determine the communication parameters of the host computer 12 as follows. At the start of the routine, the microprocessor 14 initializes and enables the timer 16. The microprocessor 14 also monitors at blocks 40–48 the serial data input from the host computer 12 via the DUART 28 until two transitions are detected so as to insure that the timing measurements are triggered on the beginning of a transition. Specifically, at block 40 the microprocessor 14 determines whether the serial data line input thereto from the DUART 28 is low and, if not, the microprocessor proceeds to block 42 to determine whether the timer 16 has reached a default timer value. If so, the microprocessor proceeds from block 42 to a main operating program with a "fail" indication. If the microprocessor 14 determines that the serial data line is low before the timer 16 reaches the default value, the microprocessor proceeds from block 40 to block 46. At block 46 the microprocessor 14 determines whether the data line has gone high and, if not, the microprocessor proceeds to block 48 to determine whether the timer 16 has reached the default timer value. If the microprocessor detects a transition from low-to-high at block 46 before the timer expires as determined at block 48, the microprocessor 14 proceeds from block 46 to block 50.

At block 50, the microprocessor initializes a counter and the timer 16 to zero to begin measuring the time between successive high-to-low and low-to-high transitions in the serial data stream to provide twenty timer value samples. More particularly, after the timer 16 and counter are initialized at block 50 and the timer begins to time, the microprocessor proceeds to block 52 to detect the next high-to-low transition. If the next high-to-low transition is detected by the microprocessor 14 at block 52 before the timer 16 reaches a default value, as determined at block 54, the microprocessor proceeds from block 52 to block 56. At block 56, the microprocessor 14 saves the value of the timer 16 at the point at which the high-to-low transition is detected and stores this timer value in a timer array. At block 56, the microprocessor 14 also resets the timer to zero so that it can begin timing again and the microprocessor 14 increments the count of the counter. From block 56, the microprocessor proceeds to block 58.

At block 58, the microprocessor determines whether the last stored timer value is the lowest value in the timer array. If the last stored timer value is the lowest in the array, this timer value is additionally saved as the lowest timer value. From block 58, the microprocessor proceeds to block 60 to detect the next successive low-to-high transition. If the next successive low-to-high transition is detected at block 60 prior to the timer 16 reaching the default value, as determined by the microprocessor at block 62, the microprocessor 14 proceeds to block 64. At block 64, the microprocessor 14 saves the value of the timer 16 at the point at which the low-to-high transition was detected in the timer array. At block 64 the microprocessor 14 also resets the timer 16 so that it can begin timing again and further increments the counter. From block 64, the microprocessor proceeds to a block 66 to again determine if the last timer value stored in the timer array is the lowest by comparing the last stored timer value to the timer value that was previously stored as the lowest timer value. If the new timer value is lower, the microprocessor 14 resets the lowest timer value to the last stored timer value. Thereafter, the microprocessor determines at a block 68 whether the count of the counter is less than 20. If so, the microprocessor proceeds from block 68 to block 52 to obtain more sample times between the successive high-to-low and low-to high transitions. After twenty timer values have been stored in the timer array, the microprocessor 14 proceeds from block 68 to a block 70.

At block 70, the microprocessor utilizes the baud rate look-up table discussed above to determine which baud rate correlates with the saved lowest timer value. The baud rate corresponding to the lowest saved timer value is determined to be the baud rate of communications received from the host computer 12. The microprocessor 14 then proceeds to block 72 to divide each timer value stored in the timer array by the lowest saved timer value. Therafter, at a block 74 the microprocessor saves in a binary array for each timer value a series of one bits or zero bits, depending upon the state of the serial data line input to the microprocessor 14 from the DUART 28, wherein the number of bits stored represents the number found from the division operation of block 72. The microprocessor 14 thus converts at blocks 72 and 74 each of the timer values into binary values that are stored in the binary array. Thereafter, at a block 76 the microprocessor 14 searches the binary array for seven consecutive zeros. At block 78, the microprocessor determines whether the seven consecutive zeros have been found, and if not, the microprocessor returns to block 44 to return with a failure indication. If, the microprocessor determines at block 78 that it has found seven consecutive zeros, the microprocessor proceeds to block 80. At block 80, the microprocessor 14 forms a coded word from the next sixteen bits of binary data stored in the array. At a block 82, the microprocessor utilizes the coded word formed at block 80 to determine parity, the number of stop bits, and the number of data bits utilizing the look-up coded word table discussed above. At block 84 the microprocessor determines whether the coded word was found in the table, and if so, the microprocessor 14 returns with a success flag at block 86.

The baud rate, parity, number of stop bits and number of data bits are used by the microprocessor 14 to automatically initialize the DUART 28 for communications with the coupled host computer 12. Therefore, the barcode printer 10, in accordance with the present invention, can be utilized with various host computers having different communication parameters without requiring the user to initialize the printer for the communications. This greatly simplifies the operation of an on-line barcode printer. Many modifications and variations of the present invention are possible in light of the above teachings. Thus, it is to be understood that, within the scope of the appended claims, the invention may be practiced otherwise than as described hereinabove.

What is claimed and desired to be secured by Letters Patent is:

1. A method of operating a barcode printer that is in communication with a host processing system to automatically determine communication parameters of said host processing system without user intervention in response to said host processing system transmitting a data stream having a plurality of high-to-low and low-to-high transitions wherein the time between at least two successive transitions of said data stream represents a single bit sample time, said method comprising:

measuring the time between successive transitions in said data stream to provide a predetermined number of timer values;

storing said timer values;

determining the lowest stored timer value; and correlating said lowest stored timer value with a baud rate value, said correlated baud rate value representing the baud rate of communications from said host processing system.

2. The method of operating a barcode printer as recited in claim 1 wherein said correlating step includes storing a look-up table having data representing a plurality of baud rates therein, each of said baud rates being stored in association with at least one timer value.

3. The method of operating a barcode printer as recited in claim 1 wherein said determining step includes comparing each timer value as it is measured to a value representing the lowest value and if the last measured timer value is less than said lowest value, setting said lowest value equal to said last measured timer value.

4. The method of operating a barcode printer as recited in claim 1 wherein said barcode printer is responsive to a data stream representing at least a predetermined number of ASCII characters containing a series of @A characters.

5. The method of operating a barcode printer as recited in claim 1 further including the steps of converting each of said timer values based on said lowest stored timer value into binary values; and determining additional communication parameters of said host processing system from said binary values.

6. The method of operating a barcode printer as recited in claim 5 wherein one of said additional parameters represents parity.

7. The method of operating a barcode printer as recited in claim 5 wherein one of said additional parameters represents a number of data bits.

8. The method of operating a barcode printer as recited in claim 5 wherein one of said additional parameters represents a number of stop bits.

9. A method of operating a barcode printer that is in communication with a host processing system to automatically determine communication parameters of said host processing system without user intervention in response to said host processing system transmitting a data stream having a plurality of high-to-low and low-to-high transitions wherein the time between at least two successive transitions of said data stream represents a single bit sample time, said method comprising:

measuring the time between successive transitions in said data stream to provide a predetermined number of timer values;

storing said timer values;

determining the lowest stored timer value;

correlating said lowest stored timer value with a first communication parameter of said host processing system; and converting each of said timer values into a binary value based on said lowest stored timer value to determine a second communication parameter of said host processing system.

10. A method of operating a barcode printer as recited in claim 9 wherein said first communication parameter represents a baud rate.

11. The method of operating a barcode printer as recited in claim 10 wherein said correlating step includes storing a look-up table having data representing a plurality of baud rates therein, each of said baud rates being stored in association with at least one timer value.

12. The method of operating a barcode printer as recited in claim 9 wherein said second communication parameter represents parity.

13. The method of operating a barcode printer as recited in claim 9 wherein said second communication parameter represents a number of data bits.

14. The method of operating a barcode printer as recited in claim 9 wherein said second communication parameter represents a number of stop bits.

15. The method of operating a barcode printer as recited in claim 9 wherein said determining step includes comparing each timer value as it is measured to a value representing the lowest value and if the last measured timer value is less than said lowest value, setting said lowest value equal to said last measured timer value.

16. The method of operating a barcode printer as recited in claim 9 wherein said barcode printer is responsive to a data stream representing at least a predetermined number of ASCII characters containing a series of @A characters.

17. In an on-line barcode printer for communicating with a host processing system that transmits to said printer a data stream having a plurality of high-to-low and low-to-high transitions with the time between at least two successive transitions of said data stream representing a single bit sample time, a system for automatically determining communication parameters of the host processing system without user intervention comprising:

means for measuring the time between successive transitions in said data stream to provide a predetermined number of timer values;

a memory for storing said timer values;

means for determining the lowest stored timer value; and means for correlating said lowest stored timer value with a baud rate value, said correlated baud rate value representing the baud rate of communications received from said host processing system.

18. A barcode printer as recited in claim 17 wherein said memory stores a look-up table having data representing a plurality of baud rates therein, each of said baud rates being stored in association with at least one timer value and said correlating means utilizes said look-up table to correlate said determined lowest stored timer value with a baud rate value.

19. A barcode printer as recited in claim 17 wherein said printer receives a data stream from said host processing system that represents at least a predetermined number of ASCII characters containing a series of @A characters.

20. A barcode printer, as recited in claim 17 further including means for converting each of said timer values into binary values based upon said lowest stored timer value; and means for determining at least one additional communication parameter of said host processing system from said stored binary values.

\* \* \* \* \*